ROBERTS & COX.

Grain Separator.

No. 3,502.

Reissued June 15, 1869.

N. PETERS, Photo-Lithographer, Washington, D. C.

UNITED STATES PATENT OFFICE.

C. AULTMAN, OF MANSFIELD, OHIO, ASSIGNEE, BY MESNE ASSIGNMENTS, OF CYRUS ROBERTS AND JOHN COX.

IMPROVEMENT IN GRAIN-SEPARATORS.

Specification forming part of Letters Patent No. 14,517, dated March 25, 1856; Reissue No. 3,502, dated June 15, 1869.

*To all whom it may concern:*

Be it known that CYRUS ROBERTS and JOHN COX, of New Hope, in the county of Bucks and State of Pennsylvania, did invent certain new and useful Improvements in Grain Separators and Cleaners, of which the following is a full, clear, and exact description, reference being had to the accompanying drawing, making a part of this specification, in which—

Figure 1:
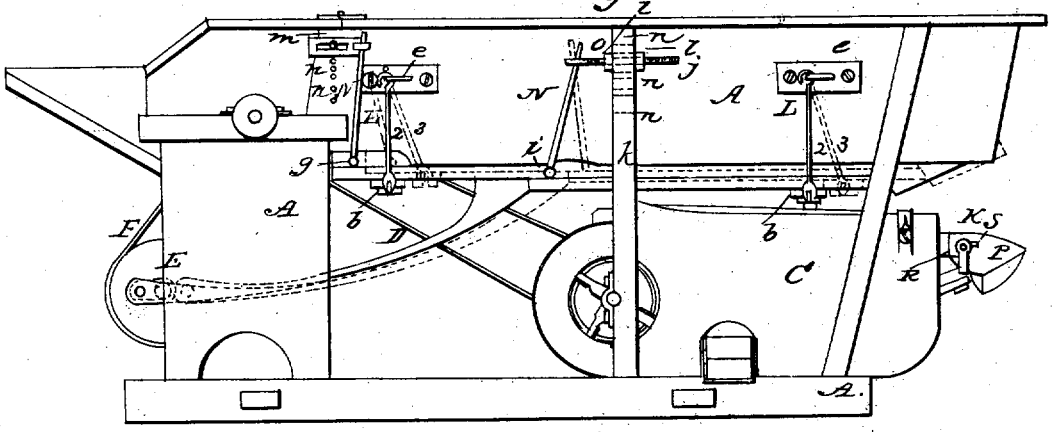
Figure 2:
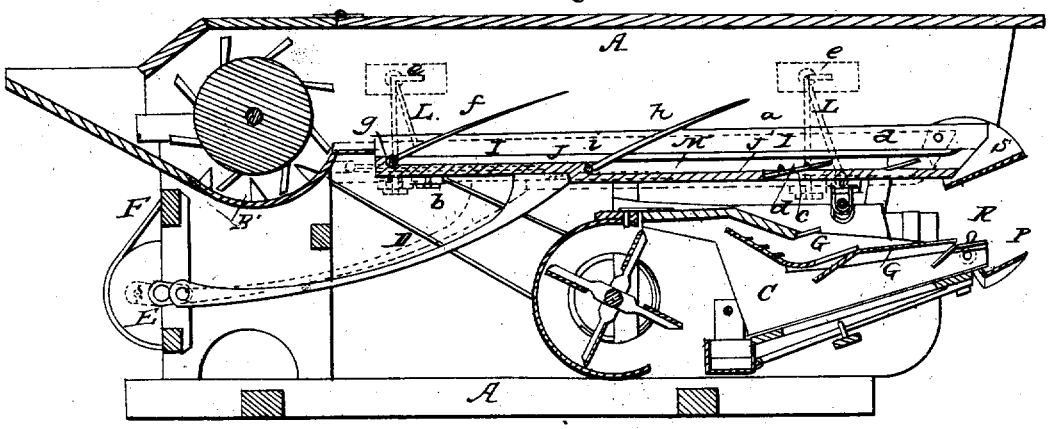
Figure 3:
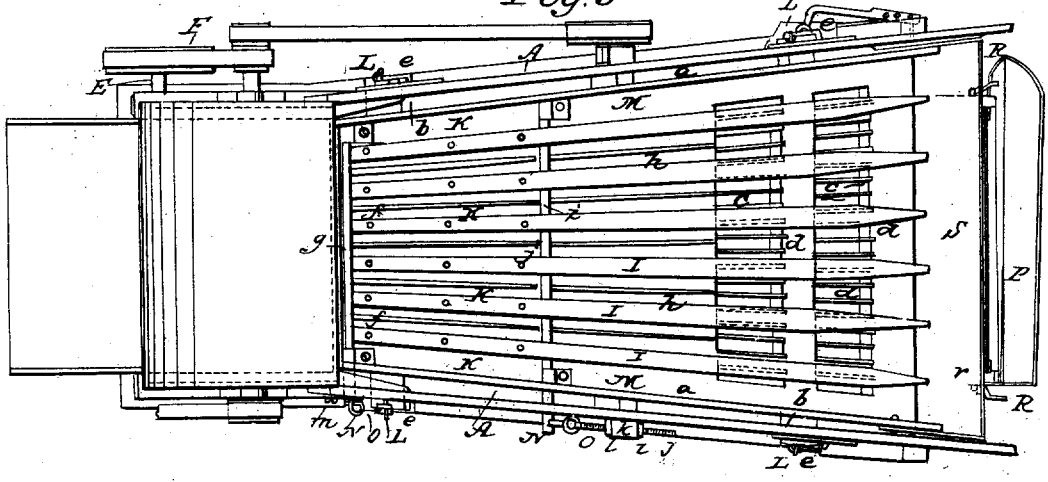

Figure 1 represents a side elevation of a machine embracing the improvements. Fig. 2 represents a vertical longitudinal section of the same; and Fig. 3 represents a top view, with the cover of the conveyer removed to show the diverging ridges and fingers in the bottom thereof.

The object of this invention is to facilitate the separation of the grain from the straw and chaff; and it consists in, first, gradually widening the separator as it recedes from the cylinder, so as to permit the sheet of mixed straw, chaff, and grain to spread laterally as it is moved forward; second, a series of diverging bars or ridges on the bottom of the separator, upon which the straw rests as it is carried forward; third, making the rear end of the conveyer, on which the grain, straw, and chaff are received from the thrasher, with a solid ridged bottom, the ridges whereof diverge as they extend forward to form channels that widen as they recede from the thrasher, for the purpose of feeding the grain and chaff more evenly into the winnowing apparatus; fourth, the combination, with a separator, of lifting rods or fingers adapted to be raised above and withdrawn below the surface of the separator on which the straw rests; fifth, the combination, with the separator, of two or more rock-shafts provided with lifting-fingers; sixth, two or more sets of lifting rods or fingers for raising the straw up from and dropping it again upon the separator-bottom; seventh, the arrangement of lifting rods or fingers, in a swinging separator, in such a manner that they will rise and shake the straw on the forward swing of said separator; eighth, the arrangement of shaking-fingers beneath the diverging carrying-bars in a recess in the bottom of the conveyer, in such manner as to allow the straw and grain to pass freely along the carrying-bars; ninth, combining an adjustable tail-spout with the winnower, for the purpose of catching the light heads which would otherwise be blown off with the chaff.

In the accompanying drawing, the frame A is represented as suitably constructed to receive and support at one end a thrashing-cylinder, B, and its concave B′, at the other a winnowing apparatus, C, and between these a conveyer and separator. The conveyer derives a reciprocating motion through a rod, D, from a crank, E, on a shaft, E′, beneath the thrasher. This shaft receives its motion through a band, F, from the shaft of the thrashing-cylinder B.

The conveyer, unlike those heretofore constructed, is made gradually wider from its rear or receiving to its front or discharging end. It is open at both ends, but fitted with sides *a* of the proper height to keep the straw and grain from falling over laterally, and is suspended by means of two radius-bars, L, on each side to the sides of the frame. The rear part of the bottom of the conveyer is closed; but its front portion over the winnower has two openings, *c*, each covered with a grating, *d*, through which the grain and chaff drop onto the riddles G. The bottom, although closed and horizontal, is not all in the same plane; but about two-thirds of its length at the forward end is sunk or depressed below the level of the rear portion to form a recess, M, the purpose of which will presently be more fully described. A number of bars, I, of about the same length as the conveyer, are secured by their rear ends to the surface of the back and more elevated portion J of the bottom, and extend forward horizontally above the depressed portion J′ of the bottom.

The bars I are equidistant, but not parallel to each other, and they diverge from their rear toward their front ends, radiating from the same center as the sides *a* of the conveyer. This arrangement of diverging bars in a widening separator causes the straw to separate and spread out laterally while it is carried forward, and it is plain that this action, by opening the straw, cannot fail greatly to facilitate the separation of the grain therefrom.

The elevated portion J of the bottom, with the bars I attached thereto, forms a solid surface, having a series of narrow ridges and wide grooves or channels, K, running lengthwise of the separator, the front ends of the grooves or channels being the widest. If these channels were straight and parallel to each other, the chaff and grain would have a tendency to bind and lodge in them until a large quantity had accumulated, which would be then suddenly discharged into the winnower, and clog the riddle, thereby imperfectly cleaning the grain and causing much of it to be wasted.

This separator is of the vibrating variety, which carries the straw forward by a series of impulses, the intervals between the impulses which are given by the forward swing of the separator being of sufficient duration for the separator to swing back to renew the impulses. It is obvious that each forward impulse will spread the grain laterally in the channels as they widen, and discharge it into the winnower in a broad, thin sheet, which is most favorable for the action of the riddles and blast, while the straw passes freely along the ridges.

The radius-bars L, by which the conveyer is suspended, are connected at their lower ends to transverse bars *b* near the ends of conveyer, and at their upper ends to staples *e* on the sides of frame A. These connections form the hinges upon which the conveyer swings.

The conveyer, thus suspended, maintains a horizontal position while vibrating by reason of the radius-bars being of equal length and describing equal arcs. The arcs, however, which the bars L describe do not extend equally on both sides of a vertical line drawn from their centers of motion, but only on one side thereof, as illustrated by Fig. 1, in which the lines 2 show the bars L in a vertical position, which is the backward extremity of their range of motion, and the dotted lines 3 show the forward extremity of their range of motion. The centers of motion of the radius-bar L must be so situated relatively to the crank E that the whole stroke of the latter will be spent in vibrating the conveyer, as above described. The object of this arrangement is to cause the conveyer to ascend on its forward and descend on its backward swing, to throw the straw forward and upward as it advances, without carrying the straw back with it as it recedes, which it would tend to do if so hung as to vibrate on both sides of the vertical lines drawn through the points of suspension.

In the bottom of the conveyer are arranged two sets of vibrating fingers, the object of which is to throw the thrashed matter up to shake it. But there is a peculiarity in this operation, which consists in causing them to rise on the advance movement of the conveyer, so that, while the straw is receiving a forward impulse along the ridges or bars, the fingers will at the same time throw up and shake the straw; and the two motions, thus co-operating with the spreading caused by the divergence of the bars, will agitate the straw so thoroughly as to leave little, if any, loose grain remaining in it. One set of these fingers, *f*, is placed at the rear extremity of the conveyer in a stock or head, *g*, in which said fingers are arranged like the teeth of a rake. The fingers extend forward between and below the upper edge of the ridges or bars in the middle of the diverging channels, and the head *g* turns on journals confined in boxes on each side of the bottom. The other set of fingers, *h*, is arranged farther forward in the bottom, with the stock or head I lying snugly against the rear side of the recess M, and also turning on journals, like head *g*. The fingers of this latter set extend forward between and below the ridges or bars to the opening *c*.

This second set of fingers is necessary to prevent the opening from choking; but were it not that they are arranged in the recess M, they could not be used without obstructing the passage of the mixed grain and chaff. Another advantage arising from this recess M is that it is so arranged as to receive the several currents of grain and chaff directly from the diverging channels, and distribute the same, in a continuous sheet, into the winnower.

One end of the head of each set of fingers projects through the side of the conveyer, and each of these projecting ends has an arm, N, rising therefrom, which is connected with an adjustable guide, *o*, secured to the side of the frame. The arms N are set in such a position that when the conveyer is at the limit of its receding motion the fingers will lie parallel to the bottom of the separator and below the upper edge of the bars upon which the straw rests, and when the conveyer advances to feed the straw the fingers will rise above said bars to lift and shake the thrashed mass, dropping it again as the conveyer recedes.

The upward range or throw of the fingers is governed by the position of the adjustable guides *o* and *o'*, and it is found important sometimes to increase and at other times to diminish this throw, to adapt it to the conditions of the straw, which, if short and dry, will not require to be lifted as high as if it were long and damp. The variations in the throw of the fingers are produced by passing the arms N through eyes in the adjustable guides *o* and *o'*, which eyes form fulcra or fixed points which retain that portion of the arm N which the eye encircles fixed, while its lower end and the finger-head are free to be vibrated with the conveyer. This rocks the head of the fingers to lift and depress the latter. It is also necessary, therefore, if it is desired to increase the throw of the fingers, to adjust the fulcra or guide through which the arms N vibrate nearer to the finger-heads, which will so change the fulcra of the arms relatively to the centers of oscillation of the finger-heads as to produce the desired increase in the lift of the fingers. The converse of this adjustment will, of course, diminish the lift of the fingers. The two guides, *o* and *o'*, as represented in the drawing, are of different forms. One, *o*, has its eye formed in the end of a screw-bolt, *j*, which passes through a post, *k*, and is adjusted by means of nuts *l*. The other, *o'*, has an eye formed in a bracket, which, by means of a set-screw, *m*, passing through a slot, fastens it to the surface of a board in the side of the frame.

To cause the fingers to descend always to the same position, and at the same time to rise to a variable height, the guide, in addition to the horizontal adjustment just described, must be adjusted vertically by shifting it in one of the holes *n*, so as to bring the eye or fulcrum of the arm N nearer to or farther from the axis of oscillation of the fingers, and horizontally by shifting them so as to set the eye to the right or left, as required. The form of the guides or their manner of adjustment is immaterial, so that they are adapted to the frame and adjusted with facility both vertically and horizontally. One advantage of having two sets of lifting or shaking fingers, instead of the single set, as heretofore, is that when they are elevated above the permanent bottom or platform of the separator they form a sort of false bottom, over which the straw can pass, and leaving a space underneath them, through which the grain may move without being swept along by the straw.

The winnower is of the usual construction, except that it is provided with an adjustable tail-spout, P, for the purpose of catching the unthrashed heads and white-caps and delivering them into a suitable receiver at the side of the machine, instead of discharging them, as heretofore, among the chaff and straw.

The tail-spout P is placed across the shoe in front of the riddles, and is secured to the side of the shoe by means of clamp-screws R. Its bottom declines toward one side of the winnower sufficiently to cause the heads to run out freely. The upper edge of its front and outer side is horizontal and parallel to its axis of motion, so that, in whatever position it may be adjusted, it will maintain the same level in relation to the riddles throughout its entire length. The upper edge of the inner side of the spout is parallel to the outer side of the riddle, and fits closely thereto. The upper end of the spout is closed, and the lug *r*, by which it is secured to the shoe, has a slot, *s*, through which the shank of the clamp-screw R passes, and by which this end of the spout may be extended from or set near to the shoe, while at the same time the spout may be adjusted in the arc of a circle, so as to bring its front side either above or below the plane of the riddle.

The unthrashed heads do not pass through the openings *c*, but off at the end of the conveyer, and are directed upon the riddle by means of an inclined plate, S, and, while the chaff and straw will be blown off, the heads and caps will be caught by the spout, and thus separated from the chaff and saved.

What is claimed herein as the invention of CYRUS ROBERTS and JOHN COX is—

1. The combination, with a separator which is made to widen as it recedes from the cylinder, of lifting or shaking rods or fingers, for the purpose of carrying forward, agitating, and attenuating the straw.

2. The method of facilitating the separation of the grain from the straw by means of diverging bars and lifting rods or fingers, substantially as herein described.

3. Constructing the rear portion of the conveyer with a solid ridged bottom, in such manner as to form a series of diverging channels to spread the grain preparatory to delivering it to the winnower, as herein set forth.

4. The combination, with a separating-platform, of lifting rods or fingers adapted to be raised above and withdrawn below the surface of the said platform, on which the straw rests.

5. The combination, with the separator, of two or more rock-shafts, provided with lifting-fingers, operating as set forth.

6. Two or more sets of lifting-fingers, or their equivalent, for raising the straw up from and dropping it again upon the separator-bottom, for the purpose described.

7. The lifting rods or fingers, in combination with means for adjusting their throw, substantially as and for the purpose set forth.

8. The employment of lifting rods or fingers arranged and operating in such manner that they will rise on the forward movement of the conveyer, and thus lift and shake the straw as it is thrown forward, in combination with the carrying-bars, whereby certain advantages are attained, as herein set forth.

9. The arrangement of lifting rods or fingers in a recess, M, in the bottom of the conveyer, in such manner that they can be alternately protruded above and retracted below the carrying-bars to shake the straw thoroughly, and at the same time not interfere with its conveyance, as herein described.

10. The adjustable turning tail-spout P, arranged substantially in the manner and for the purpose herein set forth.

CORNELIUS AULTMAN.

Witnesses:
I. M. HILLGAR,
M. D. HARTER.